United States Patent
Park et al.

(10) Patent No.: US 11,447,996 B2
(45) Date of Patent: Sep. 20, 2022

(54) STRUCTURE FOR OPERATING WATERTIGHT DOOR BY BUOYANCY

(71) Applicant: KOREA INSTITUTE OF CIVIL ENGINEERING AND BUILDING TECHNOLOGY, Goyang-si (KR)

(72) Inventors: In Hwan Park, Goyang-si (KR); Dong Sop Rhee, Uijeongbu-si (KR); Ho Je Seong, Seoul (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 90 days.

(21) Appl. No.: 17/072,369

(22) Filed: Oct. 16, 2020

(65) Prior Publication Data

US 2021/0032916 A1     Feb. 4, 2021

Related U.S. Application Data

(63) Continuation of application No. PCT/KR2019/016532, filed on Nov. 28, 2019.

(30) Foreign Application Priority Data

Jan. 9, 2019   (KR) .................. 10-2019-0002693

(51) Int. Cl.
*E05F 1/00*       (2006.01)
*E05F 15/75*      (2015.01)
(Continued)

(52) U.S. Cl.
CPC .............. *E05F 1/002* (2013.01); *E03F 5/101* (2013.01); *E05F 15/75* (2015.01); *H01H 35/18* (2013.01); *E06B 2009/007* (2013.01)

(58) Field of Classification Search
CPC ........... E05F 1/002; E05F 15/75; E03F 5/101; H01H 35/18; E06B 2009/007; E02B 3/104; E02B 7/26; E02B 7/40
See application file for complete search history.

(56) References Cited

U.S. PATENT DOCUMENTS 5,950,487 A * 9/1999 Maresca, Jr .......... G01F 23/686
                                                      250/577
6,623,209 B1 * 9/2003 Waters, Jr. ................ E02B 7/44
                                                      405/100

(Continued)

FOREIGN PATENT DOCUMENTS

JP       08284139      10/1996
KR       100980723      9/2010
(Continued)

OTHER PUBLICATIONS

International Search Report—PCT/KR2019/016532 dated Mar. 5, 2020.

*Primary Examiner* — Carib A Oquendo
(74) *Attorney, Agent, or Firm* — Cantor Colburn LLP

(57) ABSTRACT

Provided is a structure for operating a watertight door by use of buoyancy. The structure includes: a detention tank for storing rainwater flowing from a street inlet; a buoyant member which is installed in the detention tank; and a sensor installed in the detention tank, in which if the buoyant member raised by the buoyant of the rainwater collected in the detention tank comes into contact with the sensor, the watertight door is automatically operated. The watertight door structure manually operated at localized heavy rain is improved, and the watertight door is automatically operated if the water level reaches the predetermined level.

7 Claims, 3 Drawing Sheets

(51) Int. Cl.
  *E03F 5/10*  (2006.01)
  *H01H 35/18*  (2006.01)
  *E06B 9/00*  (2006.01)

(56) References Cited

U.S. PATENT DOCUMENTS

| | | | | |
|---|---|---|---|---|
| 7,658,572 | B2* | 2/2010 | Miyao | E02B 7/205 |
| | | | | 405/96 |
| 8,590,560 | B2* | 11/2013 | Komatsu | E03F 9/007 |
| | | | | 405/95 |
| 2002/0066484 | A1* | 6/2002 | Stringam | A01G 25/16 |
| | | | | 137/392 |
| 2015/0117952 | A1* | 4/2015 | Gujer | E04H 9/145 |
| | | | | 405/96 |
| 2017/0356149 | A1* | 12/2017 | Adler | E02B 3/102 |

FOREIGN PATENT DOCUMENTS

| | | |
|---|---|---|
| KR | 101306089 | 9/2013 |
| KR | 101359397 | 2/2014 |
| KR | 101911497 | 10/2018 |
| KR | 102047325 | 11/2019 |

* cited by examiner

STRUCTURE FOR OPERATING WATERTIGHT DOOR BY BUOYANCY

BACKGROUND OF THE INVENTION

Field of the Invention

The present invention relates to a structure for operating a watertight door by use of buoyancy, in which a watertight door structure manually operated at localized heavy rain is improved, and the watertight door is automatically operated if a water level reaches a predetermined level.

Description of Related Art

In recent, it has grown very attentive to watertight doors capable of preventing flooding of underground facilities and buildings at urban flood inundation caused by localized heavy rain.

Conventional watertight doors are installed to an inlet of a facility to block inflow of rainwater when it is raining.

The watertight door of a stationary type causes pedestrians inconvenience, and labor is required for installing the watertight door whenever it is heavy rain.

In the case where there is a heavy rain at night or dawn, there is a problem in that the watertight door could not be installed in time because of negligence in surveillance, so that it could not decrease the flood damage.

Therefore, the inventors have developed a structure for operating a watertight door by use of buoyancy, in which a water level is detected by the buoyancy according to rainwater flowing from a street inlet, without using a separate electric device, and thus the watertight door is automatically operated.

BRIEF SUMMARY OF THE INVENTION

The present invention relates to a structure for operating a watertight door by use of buoyancy, in which a watertight door structure manually operated at localized heavy rain is improved, and the watertight door is automatically operated if a water level reaches a predetermined level.

A structure for operating a watertight door 100 by use of buoyancy according to one embodiment of the present invention includes a detention tank 20 for storing rainwater flowing from a street inlet 10, a buoyant member 30 installed in the detention tank 20, and a sensor 40 installed in the detention tank 20.

If the buoyant member 30 raised by the buoyant of the rain water flowing in the detention tank 20 comes into contact with the sensor 40, the watertight door 100 is automatically operated.

The present invention relates to a structure for operating a watertight door by use of buoyancy, in which a watertight door structure manually operated at localized heavy rain is improved, and the watertight door is automatically operated if a water level reaches a predetermined level.

DETAILED DESCRIPTION OF THE INVENTION

Figure 1:
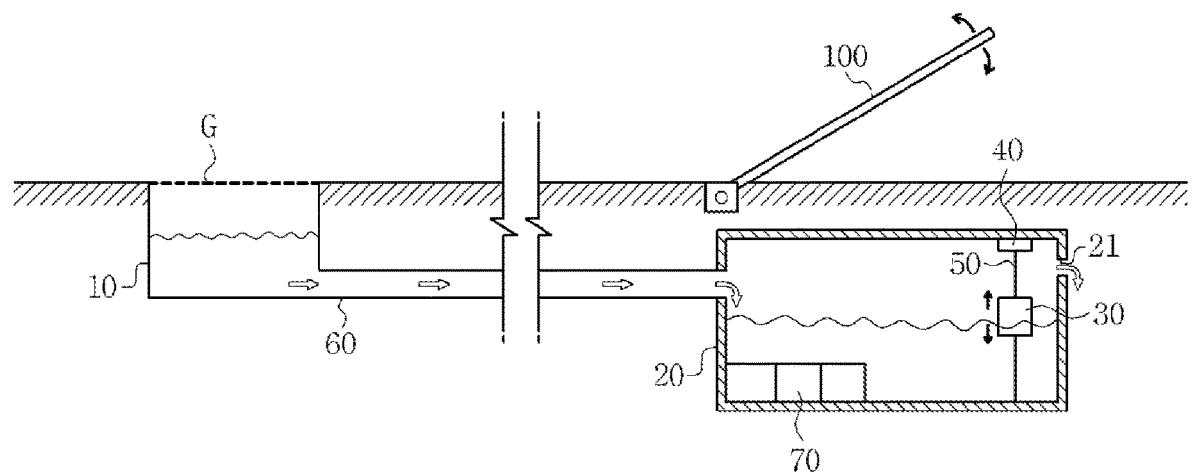
FIG. 1 is a view schematically illustrating a structure for operating a watertight door by use of buoyancy according to one embodiment of the present invention.

A structure for operating a watertight door 100 by use of buoyancy according to one embodiment of the present invention includes a detention tank 20 for storing rainwater flowing from a street inlet 10, a buoyant member 30 installed in the detention tank 20, and a sensor 40 installed in the detention tank 20.

If the buoyant member 30 raised by the buoyant of the rain water flowing in the detention tank 20 comes into contact with the sensor 40, the watertight door 100 is automatically operated.

Preferred embodiments of the present invention will now be described in detail with reference to the accompanying drawings.

FIG. 1 is a view schematically illustrating a structure for operating a watertight door by use of buoyancy according to one embodiment of the present invention.

A structure for operating a watertight door 100 by use of buoyancy according to one embodiment of the present invention includes a detention tank 20 for storing rainwater flowing from a street inlet 10, a buoyant member 30 installed in the detention tank 20, and a sensor 40 installed in the detention tank 20.

If the buoyant member 30 raised by the buoyant of the rain water flowing in the detention tank 20 comes into contact with the sensor 40, the watertight door 100 is automatically operated.

The street inlet 10 is used to collect rainwater flowing through a grating G which is provided on the street inlet, or to release the stored water.

The present invention is characterized in that the watertight door is automatically operated at an appropriate time by use of the rainwater flowing in the street inlet 10.

The sensor 40 has a switching function for operating the watertight door 100 when the sensor is brought into contact with the raised buoyant member 30.

The buoyant member 30 may be made of any expanded polystyrene, but any material, which is resistant to corrosion even though it is brought into contact with the water, can be used.

Figure 2:
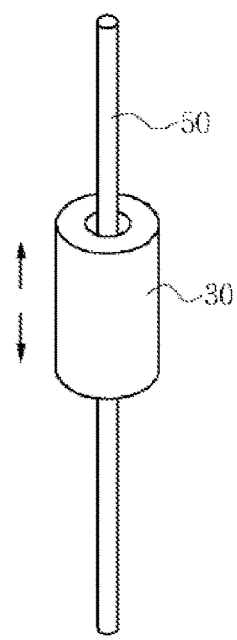
FIGS. 2 and 3 are views of a guide and a buoyant member according to one embodiment of the present invention.
Figure 3:
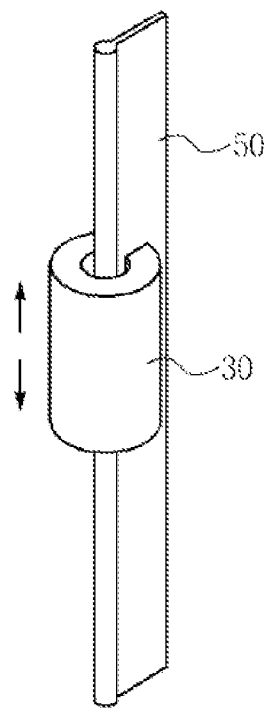

FIGS. 2 and 3 are views of a guide and a buoyant member according to one embodiment of the present invention.

A guide 50 is installed to a lower end of the sensor 40, and the buoyant member 30 is moved up and down along the guide 50.

As illustrated in FIG. 2, the buoyant member 30 is provided with a hole formed in a vertical direction, and the guide 50 penetrates the hole.

As illustrated in FIG. 3, one end of the guide 50 is attached to an inner wall of the detention tank 20, and the other end of the guide 50 is inserted into the buoyant member 30.

As illustrated in FIG. 1, an inlet pipe 60 may be installed between the street inlet 10 and the detention tank 20.

Although not illustrated in the drawings, a volume of the rainwater flowing in the detention tank 20 can be regulated by adjusting an angle of the inlet pipe 60 or installing a valve to the inlet pipe 60.

The detention tank 20 may be provided with an outlet port 21, through which the collected water is discharged, if a water level of the collected rainwater exceeds a predetermined level of the detention tank 20.

Figure 4:
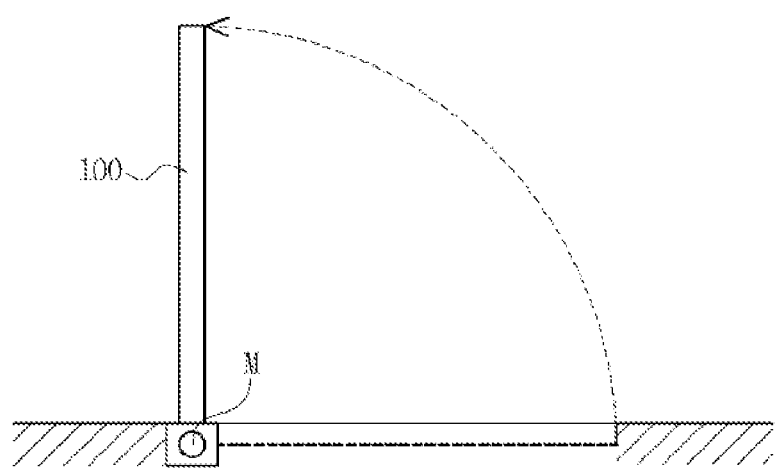
FIGS. 4 and 5 are views illustrating watertight doors according to embodiments of the present invention.
Figure 5:
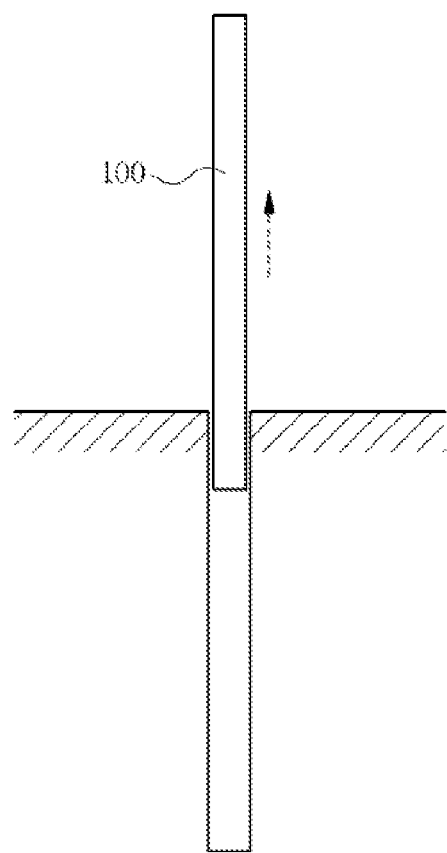

FIGS. 4 and 5 are views illustrating watertight doors according to embodiments of the present invention.

The present invention can be applied to any type of conventional watertight doors.

As illustrated in FIG. 4, the watertight door 100 of a hinge structure can stand at a right angle by an electric motor M.

As illustrated in FIG. 5, the watertight door 100 can be vertically moved up and down in the surface of a ground.

The capacity and water lever of the detention tank 20 to operate the watertight door may be varied depending upon location requirements of a building.

In this instance, the water level to operate the watertight door can be regulated by changing the height of the sensor 40.

As illustrated in FIG. 1, the detention tank 20 may be provided with a level adjusting member 70 therein, so that the water level to operate the watertight door can be regulated by installing or removing the plurality of level adjusting members 70.

The present invention proposes the responsive buried watertight door to compensate a limit of the stationary watertight door according to the related art, in which the watertight door is actively operated, depending upon situations of rainfall, thereby improving an effect of preventing flooding and a facility operating efficiency.

The watertight door of the related art has been intensively developed with respect to the door structure only, without considering its operating conditions.

The inventors have developed the responsive buried watertight door, in which the watertight door can be automatically operated according to a degree of flooding risk at intensive rainfall. Specifically, when a target area reaches a water level of flooding at rainfall, the buried watertight door is operated by the electric motor according to a signal of the sensor.

The buoyant member 30 configured to operate the sensor 40 is designed by calculating buoyancy so that the buoyant member is floated at the water level. In order to accurately operate the sensor 40, the buoyant member 30 is provided with the guide 50.

If the buoyant member 30 reaches the water level of flooding risk according to the raised water level, the buoyant member comes into contact with the contact sensor 40 to operate the watertight door 100.

In order to determine the water level of flooding risk, the volume of the detention tank 20 is calculated according to a rainfall intensity of a wanted location.

The water level of flooding risk is determined according to a floor area of the detention tank 20 and the rainfall intensity.

Accordingly, the prevent invention can quantitatively design the watertight door to reduce flood damage through the quick operation of the watertight door at strong rainfall.

Specifically, the quantitative design for operating the watertight door can be carried out with respect to an inflow volume of the rainwater flowing through the street inlet, and more accurate operating time can be set to prevent flooding of underground facilities and low-lying areas.

In addition to the effect of preventing the flooding of the underground facilities, the watertight door can be effectively operated by setting the operating time at underground shopping centers or subway entrances with a large floating population.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The present invention relates to a structure for operating a watertight door by use of buoyancy, in which a watertight door structure manually operated at localized heavy rain is improved, and the watertight door is automatically operated if a water level reaches a predetermined level.

The invention claimed is:

1. A structure for operating a watertight door (100) by use of buoyancy, the structure comprising:
    a detention tank (20) for storing rainwater flowing from a street inlet (10);
    a buoyant member (30) which is installed in the detention tank (20); and
    a sensor (40) installed in the detention tank (20),
    in which if the buoyant member (30) raised by the buoyant of the rainwater collected in the detention tank (20) comes into contact with the sensor (40), the watertight door (100) is automatically operated,
    wherein a guide (50) is installed to a lower end of the sensor (40), and the buoyant member (30) is moved up and down along the guide (50).

2. The structure for operating the watertight door (100) by use of buoyancy according to claim 1, wherein an inlet pipe (60) is installed between the street inlet (10) and the detention tank (20).

3. The structure for operating the watertight door (100) by use of buoyancy according to claim 1, wherein the detention tank (20) is provided with an outlet port (21), through which the collected water is discharged, if a water level of the rainwater collected in the detention tank exceeds a predetermined level of the detention tank (20).

4. The structure for operating the watertight door (100) by use of buoyancy according to claim 1, wherein the buoyant member (30) is provided with a hole formed in a vertical direction, and the guide (50) penetrates the hole.

5. A structure for operating a watertight door (100) by use of buoyancy, the structure comprising:
    a detention tank (20) for storing rainwater flowing from a street inlet (10);
    a buoyant member (30) which is installed in the detention tank (20); and
    a sensor (40) installed in the detention tank (20),
    in which if the buoyant member (30) raised by the buoyant of the rainwater collected in the detention tank (20) comes into contact with the sensor (40), the watertight door (100) is automatically operated,
    wherein the detention tank (20) is provided with an outlet port (21), through which the collected water is discharged, if a water level of the rainwater collected in the detention tank exceeds a predetermined level of the detention tank (20).

6. The structure for operating the watertight door (100) by use of buoyancy according to claim 5, wherein an inlet pipe (60) is installed between the street inlet (10) and the detention tank (20).

7. The structure for operating the watertight door (100) by use of buoyancy according to claim 5, wherein the buoyant member (30) is provided with a hole formed in a vertical direction, and the guide (50) penetrates the hole.

* * * * *